3,207,736
POLYMER CRYSTALLIZATION
Pieter W. O. Wijga, Amsterdam, Netherlands, assignor to Shell Oil Company, New York, N.Y., a corporation of Delaware
No Drawing. Filed Dec. 20, 1961, Ser. No. 160,888
Claims priority, application Netherlands, Dec. 21, 1960, 259,337
21 Claims. (Cl. 260—93.7)

This invention relates to an improved crystallization method for the production of composites of solid crystalline polymers with crystallization modifying additives. The method leads to the production of modified polymers having improved physical properties.

The invention relates more specifically to an improvement in a crystallization method for the production of shaped articles, and of resin composites suitable for use in producing shaped articles, from resins consisting substantially of crystallizable polymers, particularly those produced in the presence of low pressure catalysts of the Ziegler-Natta type. The invention is of outstanding advantage when used with isotactic polypropylene and will be illustrated largely with reference thereto.

Solid polypropylene is a new thermoplastic polymer which has recently achieved commercial importance. By use of appropriate conditions and catalysts it can be produced in a sterically regulated form known as isotactic polypropylene. It is difficult, if not impossible, to polymerize propylene to a polymer which has 100% isotactic structure. However, it is possible to produce, with commercially practical catalysts, polymers which have a high proportion of segments that are completely isotactic. A property which is associated with isotacticity of polypropylene is the capacity of a melt thereof to solidify in crystalline form.

Following conventional terminology, reference to "crystalline" or "isotactic" polymers means, unless the context indicates otherwise, solid polymers having a high degree of crystallinity or isotacticity, usually at least 50%, as determined by X-ray analysis or comparable methods. In general, polypropylene having a crystallinity of this order contains at most only a very small proportion of material which is extractable in boiling hydrocarbons such as gasoline boiling range hydrocarbons. Typically, the proportion of highly crystalline polypropylene which is extractable in boiling heptane or isooctane is less than 10% and usually less than 5%. Similarly, "crystallizable" polymers are those which have a molecular arrangement that enables them to solidify from a melt in a highly crystalline structure. The general practice in the art is to refer to "crystalline" or "crystallizable" polymer, rather than "partially crystalline" or "partially crystallizable" polymer even though olefin polymers of 100 percent crystal structure are not known to exist. For example, a crystallinity of 70% is extremely high for isotactic polypropylene. Reference to "polymers" herein includes both homopolymers and copolymers unless the context indicates otherwise.

Crystalline polymers, in their usual form, have some outstandingly good properties and some undesirable ones. For example, desirable properties of highly crystalline polypropylene are high tensile strength and substantial hardness. One disadvantage of the usual forms of highly crystalline polypropylene is a lack of transparency or clarity, which shows up as opacity in articles of substantial thickness and as haze in thin films. Another disadvantage of the usual forms of highly crystalline polypropylene is a relatively low impact resistance. This handicaps the use of isotactic polypropylene for making vessels or containers which during use may be subject to mechanical shock.

Polypropylene, like many other crystalline polymers, crystallizes from a melt in the form in which the individual crystals are associated in spheroid or ellipsoid bodies known as spherulites. Generally, transparency and some mechanical properties of articles made from polypropylene are better when the spherulites are relatively small.

It has been proposed in the past to add certain finely divided insoluble solid materials to polyethylene, to improve the clarity of the polymer. In another instance it has been proposed to add insoluble solids to improve polymer properties related to the rate of crystallite and spherulite growth. It has also been suggested to add related polymers.

It has now been found that certain members of an entirely different class of materials, which are liquid when combined with molten polypropylene and which, typically, are believed to be dissolved therein, can be used as additives to modify the crystallization process and thereby provide substantial improvements in physical properties of solid polypropylene and in mechanical properties of articles produced therefrom, especially those properties which are related to crystallite and spherulite structure of the polymer. Similar improvements of other crystallizable polymers may be obtained by use of additives of the same type.

The materials which result in the production of solid polypropylene of improved physical properties when used according to this invention are certain aliphatic, cycloaliphatic and aromatic dicarboxylic or higher polycarboxylic acids and corresponding anhydrides. Suitable compounds are selected from the group consisting of aromatic polycarboxylic acids having from 2 to 4 carboxyl groups per molecule, saturated cycloaliphatic dicarboxylic acids, saturated aliphatic and saturated hydrocarbon-substituted aliphatic terminal dicarboxylic acids having from 4 to 12 carbon atoms per molecule, and corresponding anhydrides. For brevity, this group of compounds will sometimes be referred to herein as "dicarboxylic acid type compounds." A number of effective members of the group are enumerated hereinafter.

The improvements of this invention are obtained when a dicarboxylic acid type compound is present as a liquid, dissolved or thoroughly dispersed in the polymer melt prior to the final crystallization thereof by cooling.

It is a specific object of this invention to provide an improved crystallization method for the production of composites of polypropylene with crystallization modifying additives.

It is another specific object of this invention to provide articles of crystalline polypropylene which, by virtue of an improved crystal structure, have improved mechanical properties, particularly improved transparency, tensile properties and injection molding characteristics.

It is another object to provide an improved crystallization method for the production of composites of crystallizable polymers, such as linear polymers of alpha-monoolefins having at least 3 carbon atoms per molecule, with crystallization modifying additives.

Another object is to provide articles of crystalline polymers such as linear polymers of alpha-monoolefins having at least 3 carbon atoms per molecule, which, by virtue of an improved crystal structure, have improved mechanical properties, particularly improved transparency, tensile properties and injection molding characteristics.

It is a major object of this invention to provide a novel method for causing crystallizable polypropylene to crystallize with a very fine spherulite structure.

Another object is to provide a novel method for causing crystallizable polymers to crystallize with a very fine spherulite structure.

Other objects will become apparent from the following description of this invention.

According to this invention, solid crystalline polypropylene and other similar solid crystalline polymers of substantially improved physical properties are prepared by carrying out at least the final crystallization from a melt comprising the normally solid, crystallizable polypropylene or other polymer, containing a small, effective amount of at least one of said dicarboxylic acid type compounds.

In another aspect, this invention cmprises improved articles of solid crystalline polypropylene or other similar solid crystalline polymers, prepared by crystallizing a melt of crystallizable normally solid polypropylene or other similar polymer, containing a small, effective amount of at least one of said dicarboxylic acid type compounds.

Several properties of the articles produced from normally solid crystalline polymers according to this invention are improved thereby. The improvement will vary, depending on the particular polymer, used, other additives used therewith, and the particular compound selected from the group of dicarboxylic acid type compounds.

Generally it is found that the spherulite dimensions in the crystallized articles produced according to this invention are substantially smaller than they would be in an article produced in identical manner from the same polymer, but without using one of said dicarboxylic acid type compounds.

It is also generally found that the transparency of film or of thicker shaped articles produced from compositions according to this invention is substantially improved, compared to that of articles produced in identical manner from the same polymer, but without using one of said dicarboxylic acid type compounds.

The modulus of elasticity of polymer produced according to this invention generally is increased over that of the identical polymer crystallized in identical manner without one of said dicarboxylic acid type compounds. Similarly, tensile strength and other tensile properties are improved.

One of the advantages of this invention is that, in general, better homogenization of the melt is obtained. Consequently, injection molding of polypropylene can be carried out at lower processing temperatures than would otherwise be possible. Another advantage is that the mixtures according to this invention solidify at a higher temperature than those of identical polymers not containing said dicarboxylic acid type compounds. Hence, processing can be carried out in a shorter period of time. Another advantage of this invention is that it is possible to apply the process to highly crystalline polymers which have a relatively high melt index, allowing their being processed at lower temperatures.

It is further often found that impact resistance is greater in articles reduced according to this invention than in those identically produced from identical polymer without one of said dicarboxylic acid type compounds.

The group of dicarboxylic acid type compounds which are selected for use in accordance with this invention includes saturated aliphatic dicarboxylic acids having at least 4 carbon atoms per molecule, saturated cycloaliphatic dicarboxylic acids, aromatic dicarboxylic acids, and the corresponding anhydrides. The acids generally preferred are those having up to 12 carbon atoms per molecule.

Particularly preferred for purposes of this invention are saturated aliphatic carboxylic acids (alkanedioic acids) having from 4 to 12 carbon atoms per molecule. All the acids of this preferred group effect a considerable improvement in physical properties of polymers. Some of the acids are particularly effective in improving transparency of the polymers. Particularly good improvements in transparency are obtained, for example, with succinic, glutaric and adipic acid and with the higher acids having even numbers of carbon atoms per molecule, such as suberic, sebacic and tetramethyladipic acid.

Good results are also obtained with saturated cycloaliphatic dicarboxylic acids, such as cis-1,4-cyclohexanedicarboxylic acid, 1,2-cyclohexanedicarboxylic acid and 1,1-cyclohexanedicarboxylic acid.

Aromatic dicarboxylic acids which provide useful results include orthophthalic acid, metaphthalic acid and tetramethylterephthalic acid.

Other useful dicarboxylic acids include aryl-substituted aliphatic dicarboxylic acids such as paraxylyl succinic acid and 3-phenylbutanedicarboxylic acid.

Some improvement in polymer properties is also obtained when polycarboxylic acids having more than two carboxylic acid groups per molecule are used, e.g., pyromellitic acid.

Anhydrides of some of the acids of the above group are equally effective. Particularly outstanding results are obtained, for example, with succinic anhydride. In another case pyromellitic anhydride is approximately as effective as the acid.

A generic formula of the effective compounds may be drawn as

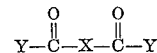

wherin X is an aliphatic radical of at least 4 carbon atoms, a cycloaliphatic radical or an aromatic radical, and wherein either each Y is a hydroxyl radical or each Y is the same oxygen atom, joining the two carboxyl carbons. The acids, then, are

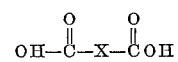

and the anhydrides are

The amount of dicarboxylic acid type compound used is preferably no more than can be dissolved completely in the molten polymer. Suitable concentrations are in the range from 0.01 to 5 percent by weight. A preferred lower concentration limit is at about 0.1 percent. The most effective compounds are preferably employed in concentrations below 1 percent, e.g., between 0.1 to 0.5 or up to 0.8 percent. Other compounds may be used in amounts up to 1 or 2 percent or more. The relative effectiveness of many of the above listed compounds is illustrated in the examples below.

The process of this invention may be carried out with a single crystallization modifying compound from the above group, or with a mixture of two or more of such compounds.

If desired, other additives may be present in the olefin polymer. Crystallization modifying additives of other types may be added. Additives which are conventionally added include antioxidants, stabilizers against ultraviolet radiation, and the like. They may be added at any convenient stage of processing.

The present invention is particularly advantageous when used with clear, unpigmented, unfilled polymers. However, the additives of this invention are also compatible with conventional fillers and pigments.

While this invention is most advantageous in providing improved articles of crystalline polypropylene it may also be employed with advantage in improving products made from other crystallizable hydrocarbon polymers, particularly alpha-olefin polymers and copolymers. Specific examples are linear polymers of ethylene, 1-butene, 4-methyl-1-pentene, and 1-hexene, crystalline copolymers of propylene with ethylene, 1-butene and the like, and crystalline polystyrene. A preferred group are isotactic polymers of alpha-monoolefin having at least 3 and up to 8 carbon atoms per molecule. Polymers of alpha-monoolefins having from 2 to 4 carbon atoms are another preferred group.

The polymers which are modified according to this invention are produced by polymerizing propylene or other suitable olefins by contact with a highly stereospecific catalyst system. A great variety of stereospecific catalysts have been described in the literature. They are generally species or modifications of the so-called Ziegler catalysts. The term "Ziegler catalyst" has come to mean, and is used herein to mean both "Ziegler type" and "Natta type" catalysts as explained in the following paragraph.

The Ziegler type catalysts may be designated "metal alkyl-reducible metal halide type," and the Natta type catalysts "preformed metal subhalide type." This terminology is used, for example, in "Polyolefin Resin Processes" by Marshall Sittig, Gulf Publishing Company, Houston, Texas, 1961. These well known catalysts are the reaction products of halides, in order of preference chlorides and bromides, of transition metals from subgroups $a$ of groups 4 and 5 of the Mendeléeff Periodic Table, as illustrated on page 28 of Ephraim, "Inorganic Chemistry," 6th English edition, i.e., of Ti, Zr, Hf, Th, V, Nb or Ta, with organo metallic reducing agents in which the metal is from groups 1, 2 or 3. Preferred reducing agents are organoaluminum compounds and particularly aluminum alkyls, including aluminum alkyl halides. The most effective catalysts for the production of isotactic polypropylene known to date are those prepared from certain forms of titanium trichloride and certain aluminum alkyls and aluminum alkyl halides.

In the production of crystallizable alpha olefin polymers, the reaction mixture formed in the low pressure polymerization is treated to deactivate the catalyst, usually by contact with a polar compound such as an alcohol and/or hydrochloric acid, and is subsequently washed for removal of at least a substantial portion of the catalyst residue. The resulting polymer almost invariably contains at least traces of the catalyst residue. Typically it may contain 50 to 500 parts per million (p.p.m.) of each of the catalyst components, calculated as the corresponding metal. A carefully purified polymer may contain as little as 10 p.p.m. of each metal or less. In order for the additives of this invention to be fully effective the polymer should contain at least 50 p.p.m. of the residue of at least one of the catalyst components, calculated as the corresponding metal.

Various methods may be employed for introducing the additive of this invention into the polymer. It is generally preferred to add the additive after the polymerization reaction has been completed, the active catalyst has been killed and the predominant part of the catalyst residue washed out of the polymer. The additive may, for example, be added to the washed polymerization slurry; the slurry is then dried and a dry mixture of additive and polymer is recovered. Alternatively, additive may be added to the dry polymer either when the polymer is in the form of a powder fluff or in the form of shaped pellets or the like. It is also possible to add the additive to the crystallizable polymer after it has been melted.

It is essential for effective results that a substantially homogeneous distribution of the additive in the molten polymer be obtained prior to the final crystallization of the polymer. To promote mixing of the polymer and the additive it is best to apply temperatures at which the polymer has a relatively low viscosity, i.e., a temperature exceeding the melting temperature of the polymer by from 20° to 50° C. The additives of this invention are believed to be generally present in the polymer melt in true solution, but some may instead be present as uniform dispersions of fine liquid droplets, e.g., as colloidal suspensions.

The manner in which mixing takes place provides a uniform distribution of the crystallization promoting additive in the polymer. This uniform distribution remains substantially unaffected during the crystallization, both when crystallization progresses very rapidly and when there is a considerable temperature gradient, as in the cooling of large objects.

An essential step in the process according to this invention is the cooling of the polymer containing the dicarboxylic acid type additive at conditions resulting in a crystalline polymer structure. The final cooling step in the production of a shaped article determines those of its effective properties which depend on crystal structure. Whereas in the absence of the additives of this invention slow cooling leads to formation of excessively large spherulites, and rapid cooling tends to lead to incompletely crystallized polymer, i.e., polymer having a lower degree of crystallinity than it is capable of achieving, the use of additives of this invention generally results in a polymer having a high degree of crystallinity and a fine spherulite structure regardless of whether the cooling is carried out very rapidly or over a relatively longer period of time. Rapid cooling can be carried out as quickly as heat conduction permits. This is, of course, a function of the geometry and heat removal capacity of each system. It can be completed in seconds in the production of film. Slow cooling may be carried out over a period from several minutes to several hours.

Cooling of the polymer mixture can take place in any suitable apparatus. Cooling is usually carried out in conventional apparatus associated with the production of shaped articles from olefin polymers.

Shaped articles from product according to this invention may be, for example, bars, sheets, films, bands, granules, rods or flakes, molded or extruded large or small shapes or filament. Shaped articles according to this invention may be manufactured from the mixtures according to this invention by casting or injection molding; films may be obtained by blowing or by slit extrusion; filaments, bars, bands and the like, may be obtained by extrusion. If desired these can be reduced, by chopping, to the form of granules, chips or the like. Filaments can be stretched to obtain further improvement of properties. Other known methods of forming shaped polyolefin articles are equally adapted to use with mixtures according to this invention.

The invention will be further described by reference to the following examples, which are not to be interpreted as limiting the invention but are merely intended to be illustrative of preferred modes of practicing the invention.

EXAMPLES 1-23

The effectiveness of a number of dicarboxylic acid type compounds in modifying the crystallization behavior of polypropylene was determined as follows:

Polypropylene was obtained as powder from a polymerization process using a reaction product of titanium trichloride and aluminum diethyl chloride as catalyst. The washed polymer retained traces of aluminum and titanium.

In each test, 5 gm. of polypropylene powder was wetted with 10 ml. of a solution of additive in acetone or other suitable volatile solvent. The solvent was thoroughly removed by evaporation under drying conditions. The powder was further homogenized by rolling in a bottle.

A small amount of the sample, 5-10 mg., was then melted between a glass slide and cover glass on a microscope hot stage. The specimens were cooled slowly and recrystallization behavior observed in normal light and between crossed Nichols prisms. The reduction in spherulite size is reported on a scale in which the numbers 1 to 4 indicate progressively more pronounced reduction in spherulite size. Results are listed in Table 1. In the absence of effective additive, large spherulites are formed and the resulting films are very turbid. With the most effective additives the films are clear, the crystallization patterns are very fine, and no spherulites are observed.

Other observations using several of the same additives and substrates have demonstrated that additives which score high on the reported microscope test result in compositions of significantly improved impact resistance and of substantially greater transparency.

*Table 1*

EFFECT OF DICARBOXYLIC ACID TYPE COMPOUNDS ON CRYSTALLIZATION OF POLYPROPYLENE

| Example | Compound | Concentration, percent wt. | Activity | Notes |
|---|---|---|---|---|
| 1 | Succinic acid | 0.3 | 4 | |
| 2 | Succinic anhydride | 0.5 | 3 | |
| 3 | do | 1 | 4 | |
| 4 | Glutaric acid | 1 | 3 | |
| 5 | Adipic acid | 0.5 | 4 | |
| 6 | Pimelic acid | 2 | 2 | |
| 7 | Suberic acid | 1 | 3 | |
| 8 | Tetramethylsuccinic acid | 1 | 2 | |
| 9 | Azelaic acid | 1 | 2 | |
| 10 | Sebacic acid | 1 | 3 | |
| 11 | Tetramethyladipic acid | 1 | 4 | |
| 12 | Itaconic acid | 0.5 | 3-4 | |
| 13 | p-Xylylsuccinic acid | 2 | 1 | |
| 14 | 3-phenylbutanedicarboxylic acid-1,2. | 2 | 2 | |
| 15 | 1,1-cyclohexanedicarboxylic acid. | 0.5 | 3-4 | |
| 16 | Cis-1,4-cyclohexanedicarboxylic acid. | 1 | 3 | |
| 17 | 1,2-cyclohexanedicarboxylic acid. | 2 | 2 | |
| 18 | o-Phthalic acid | 1 | 2 | |
| 19 | o-Phthalic acid anhydride | 1 | 3 | |
| 20 | m-Phthalic acid | 1 | 1 | (a) |
| 21 | Tetramethylterephthalic acid. | 1 | 1 | (a) |
| 22 | Trimellitic acid anhydride | 1 | 1 | (a) |
| 23 | Pyromellitic acid | 1 | 1 | (a) |

(a) Additive observed to be at least partly undissolved in polymer.

EXAMPLE 24

Further tests are carried out in polypropylene prepared in similar manner to that of Examples 1–23. To separate samples of such polypropylene, adipic and glutaric acid were added in the proportions stated below in Table 2. Addition was made at room temperature. The powdered mixtures then were milled for 5 minutes at 180° C. Plates of ½ mm. and 1 mm. thickness were pressed from the milled sheets at 230° C. The ½ mm. plates which contained adipic or glutaric acid were clear and transparent whereas a plate of the same thickness in which no crystallization modifying additive had been incorporated was merely translucent. When a plate of polypropylene prepared with adipic or glutaric acid was held 10 cm. above a printed text, the letters could be clearly read whereas they could not be read through a plate prepared without the use of a crystallization-modifying additive.

Table 2 shows the type of additive employed, the amount of additive and the mechanical properties of the products. Impact tests were carried out according to British Standard and ASTM methods with the aid of bars cut from thicker plates which had likewise been obtained from the powdered mixtures. Yield stress and elongation at rupture were measured on 1 mm. plates. The modulus of elasticity was determined on ½ mm. plates.

EXAMPLE 25

Samples are prepared similar to Example 24, but using instead of polypropylene linear polyethylene, prepared with a Ziegler type catalyst comprising a titanium halide and an aluminum alkyl. Samples of polyethylene are milled at 160° C. for 5 minutes with adipic acid, succinic anhydride, and glutaric acid, respectively. Plates of 1 mm. thickness which contain the additives are clear, while those of polyethylene without additive are merely translucent.

I claim as my invention:

1. The method of crystallizing a crystallizable polyolefin which comprises
   (A) producing a melt of
      (a) a normally solid, crystallizable polymer of an alpha-monoolefin of two to eight carbon atoms per molecule containing
      (b) at least traces of the residue of a Ziegler polymerization catalyst, and
      (c) an effective amount, in the range from 0.01 to 5 percent by weight, of a crystallization modifying polycarboxylic acid selected from the group consisting of
         (i) saturated aromatic polycarboxylic acids having from 2 to 4 carboxyl groups per molecule,
         (ii) saturated cycloaliphatic dicarboxylic acids, and
         (iii) saturated aliphatic and saturated hydrocarbon-substituted aliphatic terminal dicarboxylic acids having 4 to 12 carbon atoms per molecule,
   (B) and solidifying said melt by cooling it.

2. The method of crystallizing a crystallizable polyolefin which comprises
   (A) producing a melt of
      (a) a normally solid, crystallizable polymer of an alpha-monoolefin of two to eight carbon atoms per molecule containing
      (b) at least traces of the residue of a Ziegler polymerization catalyst, and
      (c) an effective amount, in the range from 0.01 to 5 percent by weight, of a crystallization modifying anhydride of a polycarboxylic acid selected from the group consisting of
         (i) saturated aromatic polycarboxylic acids having from 2 to 4 carboxyl groups per molecule,
         (ii) saturated cycloaliphatic dicarboxylic acids, and
         (iii) saturated aliphatic and saturated hydrocarbon-substituted aliphatic terminal dicarboxylic acids having 4 to 12 carbon atoms per molecule,
   (B) and solidifying said melt by cooling it.

3. The method of crystallizing crystallizable polypropylene which comprises
   (A) producing a melt of
      (a) normally solid, crystallizable polypropylene containing
      (b) at least 10 p.p.m., calculated as metal, of the residue of Ziegler polymerization catalyst which comprises at least one compound of a transition

*Table 2*

| Additive | Percent | Impact resistance Izod, kg. cm./cm.$^2$ | Impact resistance ASTM, kg. cm./cm.$^2$ | Yield stress, kg./cm.$^2$ | Elongation at rupture, percent | Modulus of elasticity at 50 cycles/sec; dynes/cm.$^2$ × 10$^{-10}$ |
|---|---|---|---|---|---|---|
| None | | 4.7 | 2.4 | 318 | 450 | 1.43 |
| Adipic acid | 0.25 | 8.3 | 5.2 | 325 | 735 | |
| Do | 1 | 8.1 | 5.0 | 319 | 700 | 1.66 |
| Glutaric acid | 0.5 | 9.0 | 5.0 | 324 | 1,100 | 2.20 | metal from groups IV and V of the Mendeléeff Periodic Table, and at least one organic compound of aluminum, and
(c) an effective amount, in the range from 0.1 to 0.8 percent by weight, of a crystallization modifying polycarboxylic acid selected from the group consisting of
(i) saturated aromatic polycarboxylic acids having from 2 to 4 carboxyl groups per molecule,
(ii) saturated cycloalphatic dicarboxylic acids, and
(iii) saturated aliphatic and saturated hydrocarbon-substituted aliphatic terminal dicarboxylic acids having 4 to 12 carbon atoms per molecule,
(B) and solidifying said melt by cooling it.

4. The method of crystallizing a crystallizable polypropylene which comprises
(A) producing a melt of
(a) normally solid, crystallizable polypropylene containing
(b) at least 10 p.p.m., calculated as metal, of the residue of Ziegler polymerization catalyst which comprises at least one compound of a transition metal from groups IV and V of the Mendeléeff Periodic Table, and at least one organic compound of aluminum, and
(c) an effective amount, in the range from 0.1 to 0.8 percent by weight, of a crystallization modifying anhydride of a polycarboxylic acid selected from the group consisting of
(i) saturated aromatic polycarboxylic acids having from 2 to 4 carboxyl groups per molecule,
(ii) saturated cycloaliphatic dicarboxylic acids, and
(iii) saturated aliphatic and saturated hydrocarbon-substituted aliphatic terminal dicarboxylic acids having 4 to 12 carbon atoms per molecule,
(B) and solidifying said melt by cooling it.

5. The method of crystallizing crystallizable polypropylene which comprises
(A) admixing
(a) normally solid, crystallizable polypropylene,
(b) containing at least traces of the residue of a Ziegler polymerization catalyst,
(c) with an effective amount, in the range from 0.01 to 5% by weight, of a crystallization modifying polycarboxylic acid selected from the group consisting of
(i) saturated aromatic polycarboxylic acids having from 2 to 4 carboxyl groups per molecule,
(ii) saturated cycloaliphatic dicarboxylic acids, and
(iii) saturated aliphatic and saturated hydrocarbon-substituted aliphatic terminal dicarboxylic acids having 4 to 12 carbon atoms per molecule,
(B) melting the resulting mixture, and
(C) solidifying the melt by cooling it.

6. The method of crystallizing crystallizable polypropylene which comprises
(A) admixing
(a) normally solid, crystallizable polypropylene
(b) containing at least traces of the residue of a Ziegler polymerization catalyst,
(c) with an effective amount, in the range from 0.01 to 5% by weight, of a crystallization modifying anhydride of a polycarboxylic acid selected from the group consisting of
(i) saturated aromatic polycarboxylic acids having from 2 to 4 carboxyl groups per molecule,
(ii) saturated cycloaliphatic dicarboxylic acids, and
(iii) saturated aliphatic and saturated hydrocarbon-substituted aliphatic terminal dicarboxylic acids having 4 to 12 carbon atoms per molecule,
(B) melting the resulting mixture, and
(C) solidifying the melt by cooling it.

7. A method according to claim 1 wherein said polyolefin is an isotactic polymer of an alpha-monoolefin having 3 to 8 carbon atoms per molecule.

8. A method according to claim 3 wherein said polypropylene contains at least about 50 p.p.m., measured as metal, of the residue of a low pressure polymerization catalyst which comprises at least one compound of a transition metal from groups 4 and 5 of the Mendeléeff Periodic Table, and at least one organic compound of aluminum.

9. A method according to claim 3 wherein said polycarboxylic acid is an alkanedioic acid having from 4 to 10 carbon atoms per molecule.

10. A method according to claim 3 wherein said polycarboxylic acid is a cycloalkanedioic acid.

11. A method according to claim 3 wherein said polycarboxylic acid is an aromatic dicarboxylic acid having both carboxyl groups attached to a single benzene ring.

12. A method according to claim 3 wherein said polycarboxylic acid is adipic acid.

13. A method according to claim 3 wherein said polycarboxylic acid is succinic acid.

14. A method according to claim 3 wherein said polycarboxylic acid is a cyclohexanedicarboxylic acid.

15. A method according to claim 4 wherein said anhydride is succinic anhydride.

16. As a manufacture, polypropylene produced by the method of claim 3.

17. As a manufacture, polypropylene produced by the method of claim 4.

18. As a manufacture, polypropylene produced by the method of claim 9.

19. As a manufacture, polypropylene produced by the method of claim 11.

20. As a manufacture, polypropylene produced by the method of claim 12.

21. As a manufacture, polypropylene produced by the method of claim 13.

References Cited by the Examiner

UNITED STATES PATENTS

| | | | |
|---|---|---|---|
| 2,838,437 | 6/58 | Busse et al. | 260—31.8 |
| 2,978,442 | 4/61 | Brightbill et al. | 260—94.9 |

OTHER REFERENCES

Gaylord and Mark: Linear and Stereoregular Addition Polymers, N.Y., Interscience, 1959, p. 55.

Renfrew and Morgan: Polythene, N.Y., Interscience, Aug. 15, 1960, p. 119.

JOSEPH L. SCHOFER, *Primary Examiner.*

JOSEPH R. LIBERMAN, *Examiner.*